United States Patent
Nam

(10) Patent No.: US 8,020,215 B2
(45) Date of Patent: Sep. 13, 2011

(54) ANTI KEYLOG EDITOR OF ACTIVEX BASE

(75) Inventor: Choong-Hee Nam, Seoul (KR)

(73) Assignees: Techous Co., Ltd., Seoul (KR); P&IB Co., Ltd., Seoul (KR)

( * ) Notice: Subject to any disclaimer, the term of this patent is extended or adjusted under 35 U.S.C. 154(b) by 1519 days.

(21) Appl. No.: 10/488,027

(22) PCT Filed: Jun. 20, 2002

(86) PCT No.: PCT/KR02/01158
§ 371 (c)(1),
(2), (4) Date: Feb. 27, 2004

(87) PCT Pub. No.: WO03/019343
PCT Pub. Date: Mar. 6, 2003

(65) Prior Publication Data
US 2004/0215971 A1 Oct. 28, 2004

(30) Foreign Application Priority Data
Aug. 29, 2001 (KR) .................. 10-2001-0052289

(51) Int. Cl.
*G06F 13/00* (2006.01)

(52) U.S. Cl. .............. 726/34; 710/36; 710/100

(58) Field of Classification Search ............... 726/30; 710/36, 100
See application file for complete search history.

(56) References Cited

U.S. PATENT DOCUMENTS

| | | | | |
|---|---|---|---|---|
| 4,926,173 A * | 5/1990 | Frielink | ............ | 341/22 |
| 5,056,057 A * | 10/1991 | Johnson et al. | ............ | 710/73 |
| 5,406,624 A * | 4/1995 | Tulpan | ............ | 713/192 |
| 5,745,502 A * | 4/1998 | Khayrallah et al. | ............ | 714/751 |
| 5,822,435 A * | 10/1998 | Boebert et al. | ............ | 713/192 |
| 6,006,328 A | 12/1999 | Drake | | |
| 6,216,183 B1 | 4/2001 | Rawlins | | |
| 7,328,457 B1 * | 2/2008 | Mister | ............ | 726/30 |

FOREIGN PATENT DOCUMENTS

| | | |
|---|---|---|
| JP | 1985-276081 | 6/1987 |
| JP | 1991-013277 | 9/1992 |
| JP | 2001-125714 | 5/2001 |
| KR | WO01/10079 A1 * | 2/2001 |
| WO | WO 01/10079 | 2/2001 |

OTHER PUBLICATIONS

David Jurgens, "HelpPC 2.10—keyboard commands", 5 pages, copyright 1991.*
Yeong-Deok Jeong, "Making a Game with SF-2 Producer," Korea, ISBN: 89-85553-84-4 93560, pp. 47-86, Aug. 12, 1994.
"Keyboard Scan Code Specification"; Keyboards and Mice; Chapter 31; pp. 932-943.
Harris Semiconductor; "82C55A CMOS Programmable Peripheral Interface"; Harris Corporation; 1998; File No. 2969.2; pp. 1-26.
Intel; "82C55A CHMOS Programmable Peripheral Interface"; Order No. 231256-004; Oct. 1995; pp. 1-24.

(Continued)

*Primary Examiner* — Ponnoreay Pich
(74) *Attorney, Agent, or Firm* — Echelon Law Group, PC

(57) ABSTRACT

A security program has an ActiveX format for web browsers and application programs, and comprises a software security input window for preventing leakage of keyboard data without an additional hardware device but rather by using a conventional keyboard. Therefore, the present invention protects keyboard data on the web browsers or application programs.

39 Claims, 5 Drawing Sheets

OTHER PUBLICATIONS

Intel; "UPI-C42/UPI-L42 Universal Peripheral Interface CHMOS 8-Bit Slave Microcontroller"; Order No. 290414-003; Dec. 1995; pp. 1-25.

Mark Russinovich; "Ctrl2Cap for Windows 9x"; www.sysinternals.com/Utilities/Ctrl2Cap9x.html; Jul. 9, 1997; 1 page.

IMB; "Technical Reference Personal Computer AT"; Revised Mar. 1986; 7 pages.

Korean Intellectual Property Tribune, 11th Board, Decision No. 2003dang1604, Mar. 31, 2005.

Korean Intellectual Property Tribune, 9th Board, Decision No. 2006dang533, Sep. 25, 2005.

Korean Patent Court, Decision No. 2007huh4649, Aug. 22, 2008.

Seoul Central District Court, Decision No. 2009gahap78066, Dec. 17, 2009.

\* cited by examiner

```
<HTML>
<Head>
<script language='javascript'> function geturl()
{
var ak = 'http://' + akl1.value;
window.open(ak)
}
</script>
</head>

<body>
<H1>Anti-Keylog Editor Test Page</H1><p>
The present page shows a security input window test page.
<HR><center><p>
    <OBJECT
            classid="clsid:C1BF8F0F-05BA-497C-AEDA-F377E0867B3C"
            name="akl1"
codebase="http://localhost/AKLEditXControl1.cab#version=1,0,89,9"
            width=350
            height=23
            align=center
            hspace=0
            vspace=0
    >
    <param name="Value" value="www.yahoo.com">
    <param name="Border" value="2">
    <param name="BorderLeftcolor" value="0">
    <param name="BorderRightcolor" value="0">
    <param name="BorderTopcolor" value="0">
    <param name="BorderBottomcolor" value="0">
    <param name="BorderStyle" value="1">
    <param name="Font" value="MS Sans Serif">
    <param name="Size" value="56"
    </OBJECT></p>
<input type="bottom" value" Check "onClick="geturl()">
</body>
```

(502)

US 8,020,215 B2

ANTI KEYLOG EDITOR OF ACTIVEX BASE

This is a nationalization of PCT/KR02/01158 filed Jun. 20, 2002 and published in English.

TECHNICAL FIELD

A security program has an ActiveX format for web browsers and application programs, and comprises a software security input window for preventing leakage of keyboard data without an additional hardware device but rather by using a conventional keyboard. Therefore, the present invention protects keyboard data on the web browsers or application programs.

BACKGROUND OF THE INVENTION (a) Field of the Invention

The present invention relates to an apparatus and a method for protecting keyboard data inputted by a user. More specifically, the present invention relates to an apparatus and a method for preventing leakage of the keyboard data using a security program.

(b) Description of the Related Art

Conventional techniques of keyboard data security on the Internet include a product "Kis" released by Safetek (www.e-safetek.com) in January 2001, and keyboard data input means (or methods) such as a Java-based virtual keyboard other than a conventional keyboard system. However, since the former protects keyboard data on a hardware basis, it requires an additional device, and it is accordingly difficult to be applied to a general-purpose service such as the Internet, and the latter, that is, the security using the keyboard data input means other than conventional keyboard is not greatly used because of users' lack of skill and the inconvenience involved. Hence, even though it is urgently required to secure keyboard data comprising important personal information on the Internet, no general-purpose products have been provided to the market.

According to the present invention, the input data by conventional keyboard are securely processed.

SUMMARY OF THE INVENTION

It is an object of the present invention to prevent keyboard data leakages from hacking when a user inputs personal information, writes electronic mail, or produces a document on the Internet or a network system.

To accomplish the present invention, a keyboard data protecting function and a web browser supporting function are required.

In order to perform keyboard data security, first, when a scan code, which is caused by user key input, is transmitted to a keyboard device driver from a keyboard hardware, leakage of the scan code remaining at the I/O port 6011 must be prevented. However, since general application programs may not properly control the leakage because of their hardware properties and the Windows properties, a virtual device driver (VxD) accessible to Ring 0 is to be used to prevent the above-noted leakage.

Second, while the keyboard device driver converts the scan code into keyboard data and transmits the same to a system message queue, the converted keyboard data must be not leaked by external programs including API hooking and message hooking. However, since this process may not be protected through the Windows' default operating system (USER.EXE) as general methods, another keyboard entry method that does not use the Window's default system should be supported.

Third, data leakage during the process of transmitting the keyboard data to a desired application program must be prevented. Hackers may hook or monitor the APIs or messages used by the application programs to leak the keyboard data. Therefore, a technique for securely transmitting the keyboard data to the application program is to be created.

In order to use the keyboard data on the web browser, first, it is needed for a security input window to be described using HTML documents supported by the web browser. Since the security input window does not follow the Window's default keyboard operating system, it is to be realized through a specific method to be in cooperation with the web browser.

Second, it is required to support low level tasks including communication with a virtual device driver VxD on the web browser, and controlling hardware because the security input window according to the present invention uses a security keyboard driver, and directly controls the hardware keyboard to realize the security input window.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 5 shows an exemplified HTML source to which a security input window is applied according to a preferred embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

The basic operation principle according to a preferred embodiment of the present invention on the web browsers is to not use a Microsoft Window standard keyboard process, but rather to use a security keyboard driver and a security input window to securely transmit the keyboard data input by the user to a web browser. Also, the keyboard security of the present invention prevents the user's key input data from being stolen by a hacker. The user's key input data stored (more accurately, latched) in a buffer of the keyboard hardware are immediately modified. In the present invention, the keyboard hardware means a keyboard controller; however, it can be a device to include a data latch unit for temporally storing the user's key input data, which are usually stored as a scan code therein. In the computer system, the user's key input data are transferred to a CPU via the latch unit of an I/O port which is provided for the keyboard controller, such as a controller 8255, (hereinafter, referred to as "keyboard hardware").

Figure 1:
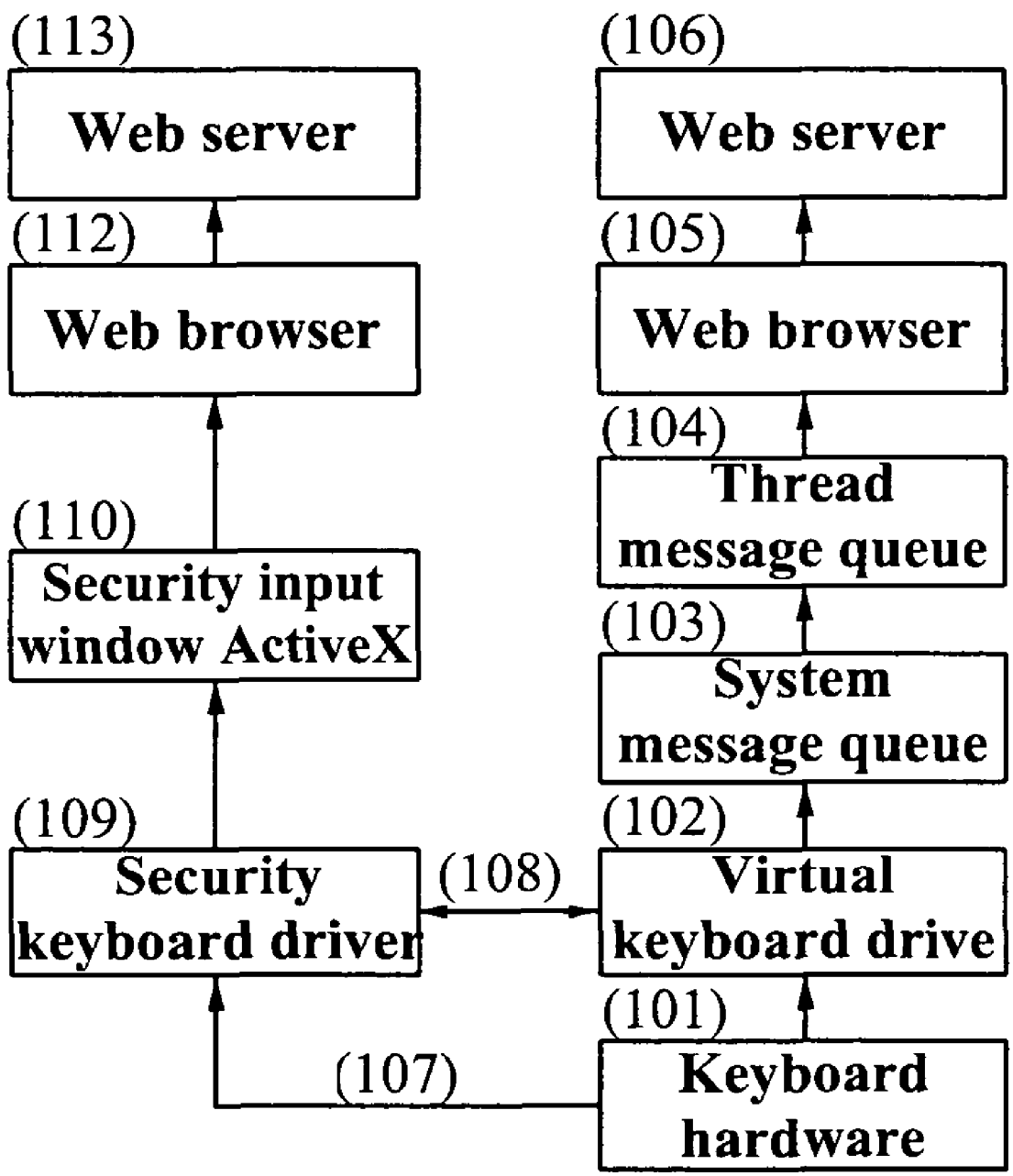
FIG. 1 shows a whole configuration of a keyboard data security system according to a preferred embodiment of the present invention.

FIG. 1 shows a whole configuration of a keyboard data security system, applied to a web browser, according to a preferred embodiment of the present invention.

First, a conventional keyboard processing of Microsoft Windows will be described. Electrical signals generated from a keyboard are provided to a keyboard hardware 101 of the motherboard, they are represented in scan codes, and they are provided to a virtual keyboard driver (VKD) 102. The keyboard driver is used as a virtual driver in Windows 98; however, this may be another keyboard driver in other operation systems. The scan codes that are different from each other depending on the keyboard type are converted by the VKD 102 into a keyboard message used as the standard of the operating system. The keyboard messages stored in a system message queue 103 are transmitted to a virtual machine (VM) currently activated by USER.EXE which is a Ring 3 component of the operating system. The keyboard data stored in the VM are transmitted to a web browser 105 through a thread message queue 103 to perform a key input task. Finally, the keyboard data stored in the VM are transmitted to a web server 106 through the web browser 105.

However, the key input task of the security input window according to a preferred embodiment of the present invention is realized in such a manner that a security keyboard driver, differing from the above-noted conventional keyboard processing, is driven.

According to the principle of the key input security task in a security input window, electrical signals generated from keyboard are provided to the keyboard hardware 101 of the motherboard, they are represented in scan codes, and they are provided to a virtual keyboard driver (VKD) 102. After this, the virtual keyboard driver 102 calls VKD_Filter_Keyboard_Input that represents a hooking function (a user redefinition function) for user-defined key management. When a carry flag is set and returned from the hooking function called by the virtual keyboard driver 102, the virtual keyboard driver 102 ignores a keyboard message and aborts subsequent keyboard message processing. The hooking function in the security keyboard driver stores the keyboard data in its queue, sets a carry, and returns the carry. Therefore, the keyboard message is not transmitted to a system message queue, a thread message queue, and a web browser, thereby preventing leakage of the keyboard data through message hooking. In this instance, the hooking function is provided to and managed by a security keyboard driver.

The security keyboard driver redefines the VKD_Filter_Keyboard_Input to prevent message hooking. However, the scan code remains in the keyboard hardware of the motherboard after the above-noted task. Scan code trace data may not be erased through a general method because of properties of the keyboard hardware. Hence, the keyboard hardware is controlled so as to erase the scan code trace data remaining in the keyboard hardware.

As to the method for erasing the trace data, when the hooking function is executed, VKD_Filter_Keyboard_Input of the security keyboard driver is called and a general control command (keyboard enable signal [F4H]) is issued and output to the keyboard hardware through the port 60H. The control command, such as the keyboard enable signal [F4H], is a control signal that dose not have an effect on the user's key input and the control signal can be selected from instructions to make meaningless data issued by the keyboard hardware, a CPU or other devices incorporated in the computer system. The keyboard data stored in the buffer are modified into the meaningless data under the control of the control command. Accordingly, since the key input data stored in the output buffer are modified immediately after the previously input data has been processed, the user's key input data are securely protected. Actually, since the key input data stored in the output buffer is not modified or erased directly, in the present invention, the modification is carried out by inputting again into the buffer the newly produced meaningless data regardless of the user's key input data. When receiving the control command from a CPU, the keyboard hardware is initialized itself with enabling the keyboard and outputs an acknowledgement (FAh) for the initialization to the CPU in response to the control command, and then erases the keyboard data stored in the output buffer of the port 60H. In this process, the keyboard data stored in the output buffer of the port 60H of the keyboard hardware are erased, the trace data of the port 60H are changed to another value FAh, and accordingly, the scan code trace data are erased. By using this process, keyboard data hacking using a keyboard port is prevented. As a result, the keyboard data remaining in the output buffer of the keyboard hardware, more particularly in an output buffer (port 60H) of the keyboard hardware, is modified into the acknowledgement (FAh) which is different from and regardless of the previously stored keyboard data. For example, the keyboard hardware can modify the keyboard data stored in the buffer therein in response to the control command from a CPU, by alternating the keyboard data into other data and erasing them. Since the alternated data means specific data which can be the acknowledgement signal from the keyboard hardware, as set forth above, or specific data. In case where the specific data, they can come from the CPU together with the control command when the security keyboard driver is driven. Alternatively, the data to be modified can individually come from the CPU, the keyboard hardware, itself, or other devices if they are provided to the output buffer in the keyboard hardware in response to the control command. Also, it is possible to use an echo signal, as a response signal to the control command, which is issued in the keyboard hardware itself after the keyboard data are outputted. As to the method for transmitting the keyboard data stored in the keyboard data queue of the security keyboard driver to the security input window 110 having the ActiveX format, states of the queue of the security keyboard driver are periodically monitored by the security input window to receive the stored keyboard data. When receiving the keyboard data, the security input window converts the keyboard data of a scan code format into characters to store them, and displays them to a screen for the user to check input states.

When the user inputs data in the security input window, and presses one of a transmit button and a check button to go to a next task, the web browser 112 refers to data properties 111 of the security input window through scripts to proceed to perform tasks assigned by the scripts.

Figure 2:
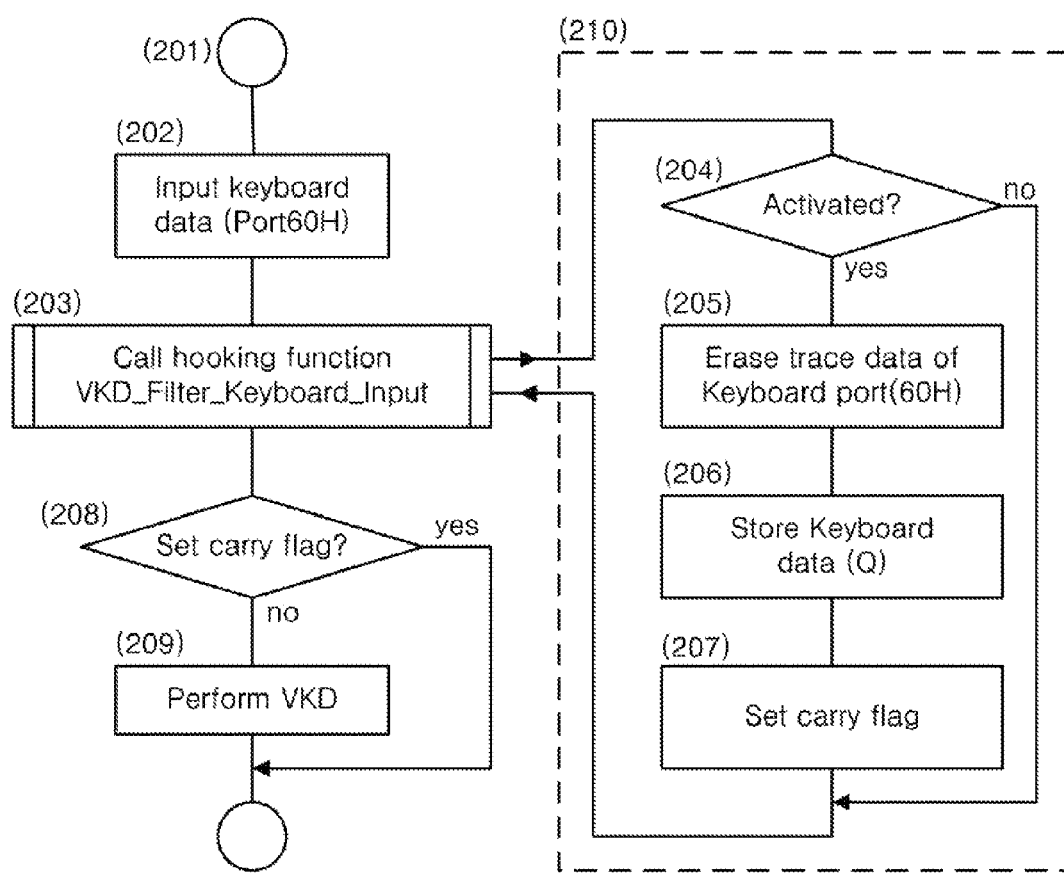
FIG. 2 shows a keyboard data flowchart of a security input window according to a preferred embodiment of the present invention.

FIG. 2 shows a flowchart for interface and management between a virtual keyboard driver and a security keyboard driver. When a user presses a keyboard button, the keyboard hardware receives keyboard data from the keyboard to generate a keyboard interrupt and call a virtual keyboard driver in step S201. The called virtual keyboard driver reads a value of the port 60H storing the keyboard data, stores it in a predetermined register, and calls a hooking function S210 of VKD_Filter_Keyboard_Input. The hooking function S210 representing a function that the security keyboard driver has, determines whether the security keyboard driver is activated or not S204, and the hooking function S210 is terminated when the security keyboard driver is not activated. It also erases the keyboard data traces of the keyboard port 60H using the above-noted method S205 when the security keyboard driver is activated and stores the keyboard data in its queue 5206. It then assigns a carry flag S207 so that the virtual keyboard driver may not use the keyboard data, and it is terminated.

When calling the hooking function, the virtual keyboard driver checks the carry flag to perform the existing virtual keyboard driver job or ignore the input keyboard data 5208 and S209.

Figure 3:
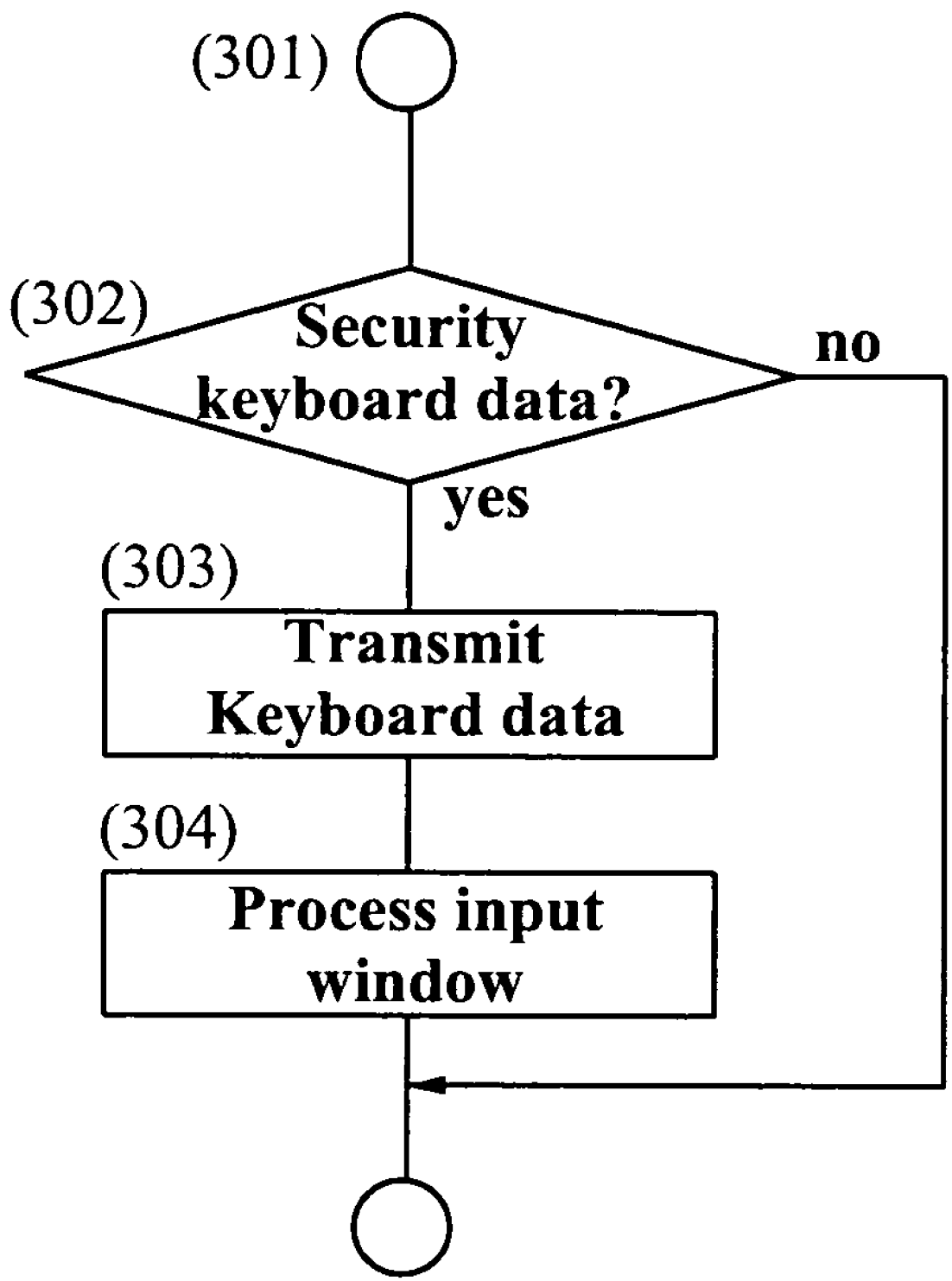
FIG. 3 shows a data flowchart between a security keyboard driver and the ActiveX according to a preferred embodiment of the present invention.

FIG. 3 shows a flowchart for processing keyboard data through interface between a security input window and a security keyboard driver. The security input window uses a timer to periodically communicate (function DeviceloControl) with the security keyboard driver in step S301 to receive security keyboard data in step S303. After receiving the security keyboard data based on the determination S302, the security input window displays or stores the security keyboard data 5304.

Figure 4:
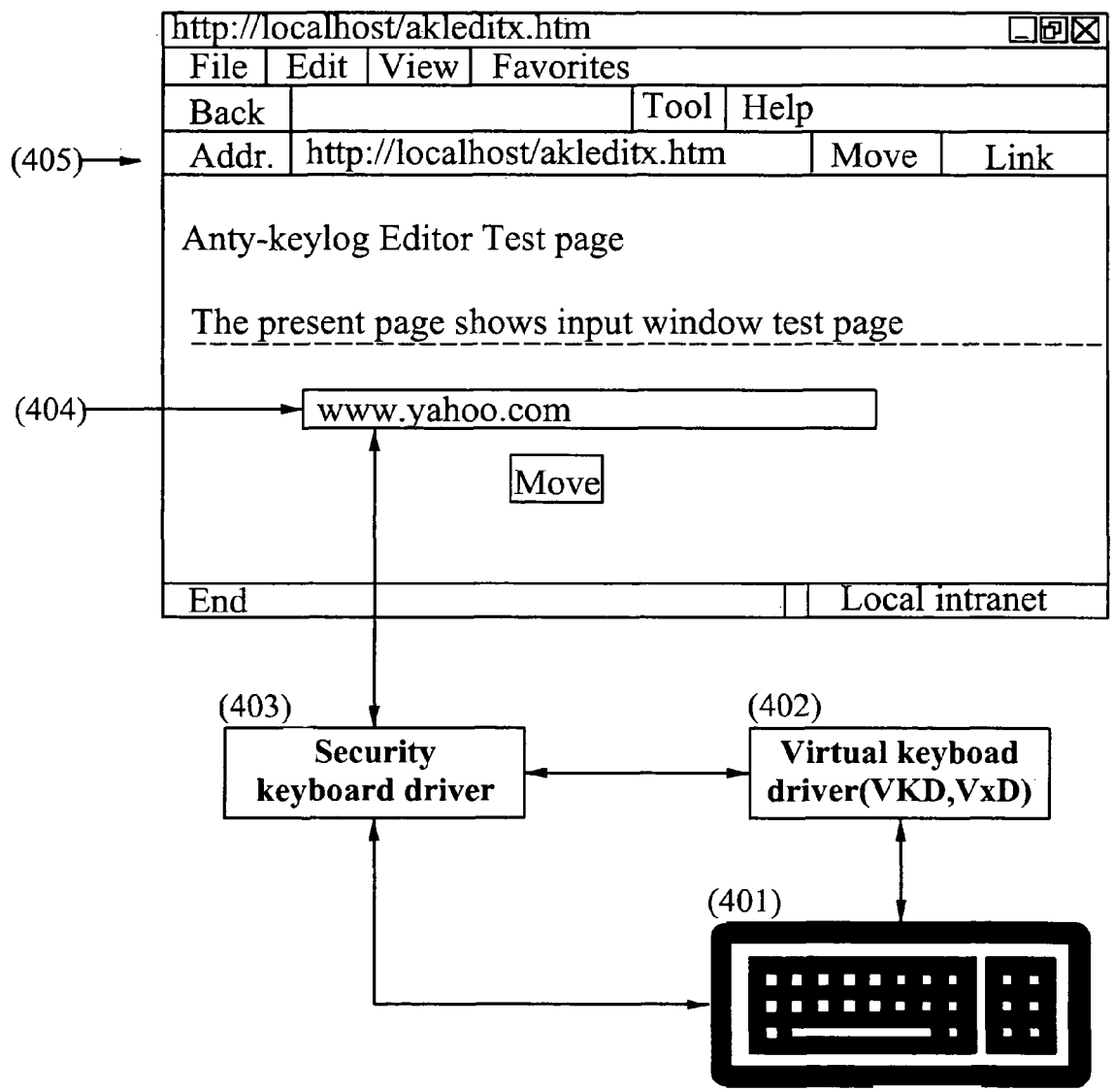
FIG. 4 shows a web browser to which a security input window is applied according to a preferred embodiment of the present invention.

FIG. 4 shows an exemplified web browser 405 to which a security input window 404 is applied, referring to HTML codes of FIG. 5. Referring to FIG. 4, when a user uses a keyboard 401 to input a web address in the security input window 404 of the browser 405 through the security driver 403 or the virtual keyboard driver 402, and presses a button 406, the user is linked to the corresponding web page.

FIG. 5 shows the security input window 501 represented in HTML code format and process of the keyboard data input to the security input window in the HTML format.

The description of the security input window in the HTML format is performed according to the ActiveX format, and the data reference of the security input window follows the ActiveX property format.

The security input window as shown in the subsequent example 502 is expressed as the OBJECT in the HTML codes.

```
<OBJECT
    classid="clsid:C1BF8F0F-05BA-497C-AEDA-F377E0867B3C"
    name="akl1"
    codebase="http://localhost/AKLEditXControl.cab#version=1,0,89,9"
    width=350
    height=23
    align=center
hspace=0
vspace=0
>
<param name="Value" value="www.yahoo.com">
<param name="Border" value="2">
<param name="BorderLeftcolor" value="0">
<param name="BorderRightcolor" value="0">
<param name="BorderTopcolor" value="0">
<param name="BorderBottomcolor" value="0">
<param name="BorderStyle" value="1">
<param name="Font" value="MS Sans Serif">
<param name="Size" value="56">
</OBJECT>
```

(Reference document: http://msdn.microsoft.com/workshop/author/dhtml/reference/objects/OBJECT.asp)

The next exemplar 501 describes a method for referring to the keyboard data input to the security input window in the HTML codes.

```
<script language="javascript">
    function geturl( ) {
        var ak = http:// + akl1.value;
        window.open(ak)
    }
</script>
```

In the above codes, akl1.value is called to refer to the data of the security input window.

1. The preferred embodiment of the present invention protects the keyboard data input by a user on the Internet to increase reliability of Internet-related industries and activate the industries.

Internet tasks including Internet banking, Internet games, web mail, web contents, and security document composition basically require a user to use a keyboard. Leaked keyboard data may cause great confusion and damage to the Internet tasks of companies.

Therefore, the use of the security key input window prevents leakages of the keyboard data to improve reliability of Internet business and to activate the Internet business, and it will reduce direct loss and damage caused by the leakage of the keyboard data.

2. The preferred embodiment does not handle malicious programs in the like manner of vaccine programs, but it copes with hacking, and hence, the preferred embodiment protects the user's keyboard data against new programs and undetected hacking programs.

3. Hackers may not steal the keyboard data using existing hacking tools if they have no new hacking techniques, which reduces the hackers' fields of action.

4. The preferred embodiment provides a software security system, and it recovers the security level through an immediate improvement when the security level of the system is lowered, thereby increasing the reliability of keyboard data security and obtaining Internet business related reliability.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The word 'comprising' and forms of the word 'comprising' as used in this description and in the claims does not limit the invention claimed to exclude any variants or additions.

What is claimed is:

1. A method of protecting keyboard data inputted by a user in a computer, comprising:
    receiving scan code data based on keyboard data inputted by a user, wherein the received scan code data are latched in an I/O port of a keyboard hardware;
    executing an input routine through a virtual keyboard driver to read the scan code data from the I/O port, wherein the latched scan code data remains in the I/O port after the scan code data are read from the I/O port;
    transmitting, through a security keyboard driver, a control command to the keyboard hardware; and
    receiving from the keyboard hardware a response signal that replaces the scan code data in the I/O port, the response signal being generated in response to the control command,
    wherein transmitting the control command to the keyboard hardware is performed after each keyboard data input.

2. The method of claim 1, wherein the control command comprises an enable command for enabling a keyboard.

3. The method of claim 2, wherein transmitting the control command to the keyboard hardware comprises transmitting the enable command to the keyboard which has already been initially enabled.

4. The method of claim 2, wherein the response signal comprises an acknowledgement signal for acknowledging receipt of the enable command.

5. The method of claim 1, wherein the control command comprises F4.

6. The method of claim 1, wherein the I/O port comprises an input buffer and an output buffer, wherein the received scan code data are latched in the output buffer and the control command is transmitted to the input buffer.

7. The method of claim 1, further comprising:
calling a hooking function for preventing the scan code data from transmitting to a system message queue or a thread message queue of the computer; and
transmitting the scan code data to an input program to be secured.

8. A method of protecting keyboard data inputted by a user in a computer having a keyboard hardware, the keyboard hardware comprising an I/O port having an input buffer and an output buffer, the method comprising:
receiving scan code data based on keyboard data inputted by the user, wherein the scan code data are latched in the output buffer of the I/O port;
executing an interrupt routine to fetch the scan code data from the output buffer to a CPU of the computer, wherein the latched scan code data remains in the output buffer after the latched scan code data are read from the output buffer;
transmitting a control command to the keyboard hardware through the input buffer of the I/O port; and
receiving from the keyboard hardware a response signal generated in response to the control command, wherein the keyboard hardware is configured to transmit the response signal to the output buffer of the I/O port,
wherein the response signal replaces the scan code data remaining in the output buffer of the I/O port, and
wherein transmitting the control command to the keyboard hardware is performed after each keyboard data input.

9. The method of claim 8, wherein the control command comprises an enable command for enabling a keyboard.

10. The method of claim 9, wherein transmitting the control command to the keyboard hardware comprises transmitting the control command to the keyboard which has already been initially enabled.

11. The method of claim 9, wherein the response signal comprises an acknowledgement signal for acknowledging receipt of the enable command.

12. The method of claim 8, wherein the control command comprises F4.

13. The method of claim 8, further comprising:
calling a hooking function for preventing the scan code data from transmitting to a system message queue or a thread message queue of the computer; and
transmitting the scan code data stored in the security keyboard driver to an input program to be secured.

14. A computer system for protecting keyboard data inputted by a user, comprising:
a keyboard hardware configured to process keyboard data inputted by a user, the keyboard hardware comprising an I/O port; and
a CPU comprising:
a keyboard driver configured to fetch scan code data from the I/O port when an interrupt routine is initiated; and
a security keyboard driver configured to send a control command to the I/O port after the keyboard driver fetches the scan code data from the I/O port,
wherein the keyboard hardware is configured to receive the control command from the security keyboard driver of the CPU and generate a response signal in response to the control command after each keyboard data input, and
wherein the keyboard hardware is configured to transmit the response signal to the CPU through the I/O port to replace the scan code data in the I/O port.

15. The computer system of claim 14, wherein the control command comprises an enable command for enabling a keyboard.

16. The computer system of claim 15, wherein the keyboard is already enabled prior to receiving the enable command.

17. The computer system of claim 15, wherein the response signal from the keyboard comprises an acknowledgement signal for acknowledging receipt of the enable command.

18. The computer system of claim 14, wherein the control command comprises F4.

19. The computer system of claim 14, wherein the I/O port comprises an input buffer and an output buffer, wherein the scan code data inputted by the user are latched in the output buffer, and wherein the control command from the security keyboard driver is inputted through the input buffer.

20. The computer system of claim 14, wherein the security keyboard driver is configured to perform a hooking function for preventing the keyboard data from transmitting to a system message queue or a thread message queue.

21. A computer system comprising a non-transitory computer useable medium having a security program embodied therein for protecting keyboard data inputted by a user, the security program comprising:
a keyboard driver configured to fetch scan code data stored in an I/O port of a keyboard hardware to a CPU when an interrupt routine is initiated; and
a security keyboard driver configured to send a control command to the keyboard hardware after the keyboard driver fetches the scan code data from the I/O port, the control command being configured to cause the keyboard hardware to generate a response signal,
wherein the response signal replaces the scan code data stored in the I/O port, and
wherein the security keyboard driver is configured to send the control command to the keyboard hardware after each keyboard data input.

22. The computer system of claim 21, wherein the control command comprises an enable command for enabling a keyboard.

23. The computer system of claim 22, wherein the keyboard is already enabled prior to receiving the enable command.

24. The computer system of claim 22, wherein the response signal from the keyboard comprises an acknowledgement signal for acknowledging receipt of the enable command.

25. The computer system of claim 21, wherein the control command comprises F4.

26. The computer system of claim 21, wherein the I/O port comprises an input buffer and an output buffer, wherein the scan code data are stored in the output buffer, and wherein the control command is sent to the input buffer.

27. The computer system of claim 21, wherein the security keyboard driver is configured to perform a hooking function for preventing the scan code data from transmitting to a system message queue or a thread message queue.

28. The computer system of claim 27, wherein the security keyboard driver is configured to store the scan code data and transmit the stored scan code data to an input program to be secured.

29. A non-transitory computer readable medium in a computer having a processor that stores instructions for executing a method for protecting keyboard data in the computer, the method comprising:
receiving scan code data based on keyboard data inputted by a user, wherein the scan code data are latched in an I/O port of a keyboard hardware;
executing an input routine through a virtual keyboard driver to read the scan code data from the I/O port, wherein the scan code data remains in the I/O port after the scan code data are read from the I/O port;
transmitting, through a security keyboard driver, a control command to the keyboard hardware after each keyboard data is inputted by the user; and
receiving from the keyboard hardware a response signal that replaces the latched scan code data in the I/O port, the response signal being generated in response to the control command.

30. The medium of claim 29, wherein the control command comprises an enable command for enabling a keyboard.

31. The medium of claim 30, wherein transmitting the control command to the keyboard hardware comprises transmitting the enable command to the keyboard which has already been initially enabled.

32. The medium of claim 30, wherein the response signal comprises an acknowledgement signal for acknowledging receipt of the enable command.

33. The medium of claim 29, wherein the I/O port comprises an input buffer and an output buffer, wherein the scan code data are latched in the output buffer and the control command is transmitted to the input buffer.

34. The medium of claim 29, wherein the method further comprises:
calling a hooking function for preventing the scan code data from transmitting to a system message queue or a thread message queue of the computer; and
transmitting the scan code data stored in the security keyboard driver to an input program to be secured.

35. In a computer having a keyboard hardware comprising an I/O port for communicating with a CPU, the I/O port comprising an input buffer and an output buffer, the output buffer being configured such that scan code data latched therein cannot be erased directly by a CPU but remains in the output buffer unless another data are inputted from the keyboard hardware to replace the latched scan code data, a method of protecting keyboard data inputted by a user, comprising:
receiving scan code data based on keyboard data inputted by a user, wherein the received scan code data are latched in the output buffer of the I/O port;
reading, through a virtual keyboard driver, the scan code data from the output buffer of the I/O port;
transmitting, through a security keyboard driver, a control command to the keyboard hardware after reading the scan code data; and
receiving from the keyboard hardware a response signal for replacing the scan code data in the I/O port, wherein the response signal is generated in response to the control command,
wherein transmitting the control command to the keyboard hardware is performed after each keyboard data input.

36. The method of claim 35, wherein the control command comprises an enable command for enabling a keyboard.

37. The method of claim 36, wherein transmitting the control command to the keyboard hardware comprises transmitting the enable command to the keyboard which has already been enabled.

38. The method of claim 36, wherein the response signal comprises an acknowledgement signal for acknowledging receipt of the enable command.

39. The method of claim 35, further comprising:
calling a hooking function for preventing the scan code data from transmitting to a system message queue or a thread message queue of the computer; and
transmitting the scan code data to an input program to be secured.

* * * * *